(12) United States Patent
Seto et al.

(10) Patent No.: US 6,878,458 B2
(45) Date of Patent: Apr. 12, 2005

(54) METAL FOIL FOR CURRENT COLLECTOR OF SECONDARY BATTERY AND METHOD OF PRODUCING THE SAME

(75) Inventors: Hirohisa Seto, Kobe (JP); Tadayuki Tamaki, Sakai (JP); Toshiaki Shiota, Kyoto (JP); Ryoichi Noumi, Mino (JP); Kunihiro Fukui, Kobe (JP); Masanari Kimoto, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 44 days.

(21) Appl. No.: 10/468,905

(22) PCT Filed: Sep. 12, 2002

(86) PCT No.: PCT/JP02/09388

§ 371 (c)(1),
(2), (4) Date: Aug. 26, 2003

(87) PCT Pub. No.: WO2004/025758

PCT Pub. Date: Mar. 25, 2004

(65) Prior Publication Data

US 2004/0157128 A1 Aug. 12, 2004

(51) Int. Cl.$^7$ .............................. H01M 4/64; C25D 1/04
(52) U.S. Cl. ........................................ 428/606; 428/935
(58) Field of Search ................................ 428/606, 935; 148/426; 205/76, 77, 78, 224; 429/209

(56) References Cited

U.S. PATENT DOCUMENTS

| | | | | |
|---|---|---|---|---|
| 5,472,333 A | * | 12/1995 | van der Zel | 425/464 |
| 5,700,562 A | * | 12/1997 | Sugimoto et al. | 428/327 |
| 5,830,583 A | * | 11/1998 | Clouser et al. | 428/606 |

FOREIGN PATENT DOCUMENTS

| | | |
|---|---|---|
| JP | 11-126613 | 5/1999 |
| JP | 11-323593 | 11/1999 |
| JP | P2001-189154 | 7/2001 |
| JP | 2002-280000 | 9/2002 |

* cited by examiner

*Primary Examiner*—John J. Zimmerman
(74) *Attorney, Agent, or Firm*—McDermott Will & Emery LLP

(57) ABSTRACT

A metal foil for a current collector of a secondary battery formed by electrodeposition and has a thickness (T) of 8 to 40 μm, the metal foil satisfying the following formulae:

$$4.9 \times 10^8 \leq T \times S \times Y \leq 31 \times 10^8$$

$$4.5 \leq \epsilon - (0.0005 \times T^2) \leq 15$$

where S is a breaking strength (MPa), ε is a tensile elongation (%) and Y is a Young's modulus (MPa).

This foil is preferably a nickel foil and is manufactured by softening or annealing the metal foil obtained by electrodeposition. Thereby, a metal foil for a negative electrode of a secondary battery is obtained with an excellent capability of supporting the active material and large electric conductivity.

3 Claims, No Drawings

METAL FOIL FOR CURRENT COLLECTOR OF SECONDARY BATTERY AND METHOD OF PRODUCING THE SAME

TECHNICAL FIELD

The present invention relates to a metal foil which is mainly made of metal such as nickel, copper, iron, aluminum or an alloy thereof and is suitable as a current collector of a secondary battery, and a method of manufacturing the same.

BACKGROUND ART

According to the rapid spread of electronic devices such as personal computers and cellular phones in recent years, batteries capable of charging and discharging by a large capacity are in use, e.g., nickel-metal hydride secondary batteries, lithium ion secondary batteries and lithium polymer secondary batteries. Lately, these batteries are also used as a power source of electric vehicles.

A secondary battery of this kind fundamentally comprises ① a metallic current collector in the form of a foil, ② an electrode formed by coating a material which causes electrochemical reaction in a reversible manner, i.e., a so-called active material, on the current collector, ③ a separator for isolation between a positive electrode and a negative electrode and ④ an electrolyte and a battery case.

In relation to such a secondary battery, the metallic current collector in the foil shape of the above item ① needs to have a capability of supporting the active material. As a method of improving the capability of supporting the active material, is known a method of opening a plurality of apertures in the metal foil to improve the supporting capability of the foil with a binding force between the active materials adhered to both surfaces of the metal foil (see Japanese Laid-Open Patent Publication No. HEI 11-323593).

Since the secondary batteries are used in various electronic devices as described above, they vary greatly in size and shape. In particular, for portable electronic devices which are continuously being downsized, a small button-shaped secondary battery is used. With the use of the metal foil provided with a plurality of apertures, the current collector is reduced in volume and the current collecting ability is decreased.

The negative electrode coated with the active material of the above item ② is manufactured by applying the active material on both surfaces of the metal foil, followed by heating for drying and sintering, and press-bonding. Therefore, the plural apertures provided to penetrate the metal foil may cause reduction in strength and the foil may be broken during the above-described steps. In order to avoid the break, it is necessary to reconstruct the manufacturing facilities in accordance with the reduction of the foil strength.

DISCLOSURE OF INVENTION

An object of the present invention is to provide a metal foil for a current collector of a secondary battery showing an excellent capability of supporting an active material even if the foil is not made porous and being free from the problem of the break of the foil as described above, and a method of manufacturing the same.

As a result of intense study on the metal foil to be used as an electrode having an excellent capability of supporting the active material, the inventors of the present invention have found that the following characteristics should be added to the metal foil and thus achieved the present invention.

The electrode is formed by applying the active material to the metal foil, followed by drying and press-bonding using rollers. In the step of press-bonding, the metal foil is pressed by the active material particles to cause plastic deformation, thereby making the particles sink into the foil and improving the supporting capability (adhesion). Further, also in the press-bonding step, the metal foil is warped by irregularity of the plural particles to envelop the particles, thereby improving the supporting capability. Further, since the metal foil needs to be conveyed continuously in the press-bonding step as in the case of rolling metal, the metal foil also is required to have tensile strength.

In other words, the metal foil used as the current collector of the electrode needs to be thin, easy to deform and strong to a certain degree. The inventors of the present invention have realized such a metal foil by optimizing the thickness of the metal foil and the characteristics of the material.

The gist of the present invention lies in a metal foil for a current collector of a secondary battery as described below and a method of manufacturing the same.

A metal foil for a current collector of a secondary battery formed by electrodeposition and has a thickness (T) of 8 to 40 μm, the metal foil satisfying the following formulae:

$$4.9 \times 10^8 \leq T \times S \times Y \leq 31 \times 10^8$$

$$4.5 \leq \epsilon - (0.0005 \times T^2) \leq 15$$

where S is a breaking strength (MPa), $\epsilon$ is a tensile elongation (%) and Y is a Young's modulus (MPa).

The above-described metal foil is preferably a nickel foil and is manufactured by softening or annealing the metal foil formed by electrodeposition. An annealing furnace may be a continuous-type furnace or a batch-type furnace.

BEST MODE FOR CARRYING OUT THE INVENTION

The metal foil for a current collector of a secondary battery according to the present invention is thin and soft and has a certain degree of strength.

(1) Thickness (T) of Metal Foil: 8 to 40 μm

If the thickness (T) of the metal foil exceeds 40 μm, the capability of supporting the active material is deteriorated. Therefore, in order that the metal foil supports the active material of the battery to a sufficient degree, the thickness (T) of the metal foil needs to be reduced in the range of not more than 40 μm. However, if the thickness (T) of the metal foil is less than 8 μm, electrical resistance of the resulting electrode increases, which is not suitable as the current collector of the battery. Further, the foil is broken during the manufacture thereof or in the step of press-bonding the active material. Accordingly, the thickness (T) of the metal foil of the present invention is limited to 8 to 40 μm.

(2) $4.9 \times 10^8 \leq T \times S \times Y \leq 31 \times 10^8$

In the step of press-bonding the active material to the metal foil to form the electrode, the metal foil is conveyed on a rolling machine such as a rolling mill for metal with a tension applied thereto and the press-bonding is performed between upper and lower rollers. Accordingly, the metal foil is required to have a large strength and extensibility. However, the metallic material is apt to decrease in extensibility as the strength increases.

Then, the inventors of the present invention have performed a detailed study on the existing manufacture line from a dynamic aspect and reached the following findings.

On the existing electrode manufacture line, there are problems of the break of the metal foil caused by a tension applied thereto on the line and poor flatness due to the plastic deformation. The break of the metal foil is not caused if the whole resistance of the metal foil, i.e., the product of the thickness T and the breaking strength S, is larger than the tension applied thereto on the line. Further, if the metal foil has a larger Young's modulus, it is less liable to cause the plastic deformation.

From these findings, the inventors of the present invention have found that the relationship of the thickness T ($\mu$m), the breaking strength S (MPa) and the Young's modulus Y (MPa) of the metal foil with a breaking characteristic of the metal foil is explained by T×S×Y. More specifically, they have found that the metal foil is not broken if the following formula (A) is satisfied. The Young's modulus is the one at room temperature (25° C.).

$$4.9 \times 10^8 \leq T \times S \times Y \leq 31 \times 10^8 \tag{A}$$

(3) $4.5 \leq \epsilon - (0.0005 \times T^2) \leq 15$

A factor for improving the capability of supporting the active material is an effect of enveloping the active material by the metal foil deformed in the press-bonding step. This deformation is caused to a greater extent if the tensile elongation $\epsilon$ of the metal foil is larger and the thickness T thereof is smaller. Therefore, the inventors of the present invention have found that the relationship of the tensile elongation $\epsilon$ (%) and the thickness T ($\mu$m) with the capability of supporting the active material is explained by $\epsilon - (0.0005 \times T^2)$. More specifically, they have found that the active material is effectively supported during the press-bonding step if the following formula (B) is satisfied.

$$4.5 \leq \epsilon - (0.0005 \times T^2) \leq 15 \tag{B}$$

Material for the metal foil may be any of nickel, copper, iron and an alloy thereof as long as the characteristics described in the above items (1), (2) and (3) are obtained. Alternatively, these metals may be layered. The metal foil of the present invention is produced by electrodeposition. The metal foil is preferably softened or annealed after the electrodeposition.

After the metal foil is formed by electrodeposition, crystals of the metal foil are fine and the tensile elongation is small. However, the crystal size can be adjusted by subjecting the foil to the softening or annealing, thereby the physical properties such as the tensile elongation and the breaking strength can be adjusted. There are no particular limitations to the conditions for the softening or annealing. For example, the metal foil may be heated to 500 to 900° C. at a heating rate of not more than 10° C./minute, retaining the metal foil at the same temperature for 10 seconds or less and cooling slowly at a cooling rate of not more than 10° C./minute.

EXAMPLE

In this example, metal foils as indicated in Table 1 were formed using a rotation drum type electrodeposition apparatus.

TABLE 1

| Class | No. | Kind of metal | Thickness T ($\mu$m) | Material temperature during annealing (° C.) | Young's modulus Y (MPa) | Breaking strength S (MPa) | Tensile elongation $\epsilon$ (%) | T × S × Y × $10^8$ | $\epsilon$ - $0.0005T^2$ | Capability of supporting active material |
|---|---|---|---|---|---|---|---|---|---|---|
| Examples of the present invention | 1 | Ni | 8 | 720 | 205000 | 330 | 12.1 | 5.4 | 12.1 | ⊙ |
| | 2 | Ni | 8 | 650 | 205000 | 400 | 10.3 | 6.6 | 10.3 | ⊙ |
| | 3 | Ni | 8 | 570 | 205000 | 445 | 7.5 | 7.3 | 7.5 | ⊙ |
| | 4 | Ni | 8 | 500 | 205000 | 470 | 5.5 | 7.7 | 5.5 | ⊙ |
| | 5 | Ni | 15 | 750 | 205000 | 370 | 13.1 | 11.4 | 13.0 | ⊙ |
| | 6 | Ni | 15 | 720 | 205000 | 420 | 12.3 | 12.9 | 12.2 | ⊙ |
| | 7 | Ni | 15 | 650 | 205000 | 450 | 10.6 | 13.8 | 10.5 | ⊙ |
| | 8 | Ni | 15 | 530 | 205000 | 490 | 6.5 | 15.1 | 6.4 | ⊙ |
| | 9 | Ni | 20 | 790 | 205000 | 380 | 14.5 | 15.6 | 14.3 | ⊙ |
| | 10 | Ni | 20 | 730 | 205000 | 425 | 13.5 | 17.4 | 13.3 | ⊙ |
| | 11 | Ni | 20 | 670 | 205000 | 460 | 11.5 | 18.9 | 11.3 | ⊙ |
| | 12 | Ni | 20 | 540 | 205000 | 490 | 6.8 | 20.1 | 6.6 | ⊙ |
| | 13 | Ni | 20 | 500 | 205000 | 530 | 5.6 | 21.7 | 5.4 | ⊙ |
| | 14 | Ni | 25 | 790 | 205000 | 390 | 14.5 | 20.0 | 14.2 | ⊙ |
| | 15 | Ni | 25 | 720 | 205000 | 420 | 12.2 | 21.5 | 11.9 | ⊙ |
| | 16 | Ni | 25 | 650 | 205000 | 490 | 9.5 | 25.1 | 9.2 | ⊙ |
| | 17 | Ni | 30 | 790 | 205000 | 390 | 14.8 | 24.0 | 14.4 | ⊙ |
| | 18 | Ni | 30 | 720 | 205000 | 430 | 12.5 | 26.4 | 12.1 | ⊙ |
| | 19 | Ni | 35 | 790 | 205000 | 380 | 15.0 | 27.3 | 14.4 | ⊙ |
| | 20 | Ni | 35 | 720 | 205000 | 430 | 12.8 | 30.9 | 12.2 | ○ |
| | 21 | Ni | 40 | 800 | 205000 | 365 | 15.6 | 29.9 | 14.8 | ○ |
| | 22 | Fe | 30 | 700 | 190000 | 300 | 8.5 | 17.1 | 8.1 | ○ |
| | 23 | Cu | 30 | 650 | 136000 | 150 | 12.4 | 6.1 | 12.0 | ○ |
| Comparative examples | 24 | Ni | 10 | 820 | 205000 | 300 | 16.0 | 6.2 | 16.0 | X |
| | 25 | Ni | 20 | 470 | 205000 | 600 | 4.6 | 24.6 | 4.4 | X |
| | 26 | Ni | 20 | 820 | 205000 | 350 | 16.2 | 14.4 | 16.0 | X |
| | 27 | Ni | 30 | — | 205000 | 700 | 2.1 | 43.1 | 1.7 | X |
| | 28 | Ni | 42 | 800 | 205000 | 365 | 15.8 | 31.4 | 14.9 | Δ |
| | 29 | Ni | 50 | 800 | 205000 | 360 | 15.8 | 36.9 | 14.6 | X |
| | 30 | Fe | 30 | 450 | 190000 | 450 | 3.1 | 25.7 | 2.7 | X |
| | 31 | Cu | 30 | 450 | 136000 | 310 | 4.4 | 12.6 | 4.0 | X |

The Young's modulus Y of each metal foil indicated in Table 1 was the one at room temperature (25° C.). The electrolyte used and the conditions for the electrolysis were as follows.

(1) Nickel Foil
Electrolyte

| | |
|---|---|
| nickel sulfate | 250 g/l |
| nickel chloride | 45 g/l |
| boric acid | 40 g/l |
| pH | 3.5 |
| temperature | 50° C. |
| Current density | 80 A/dm$^2$ |

(2) Iron Foil
Electrolyte

| | |
|---|---|
| iron (II) sulfate | 250 g/l |
| ammonium sulfate | 45 g/l |
| pH | 2.2 |
| temperature | 50° C. |
| Current density | 10 A/dm$^2$ |

(3) Copper foil
Electrolyte

| | |
|---|---|
| copper sulfate | 200 g/l |
| sulfuric acid | 50 g/l |
| temperature | 35° C. |
| Current density | 40 A/dm$^2$ |

The annealing of the resulting foils was performed by heating to the material temperature shown in Table 1 at a heating rate of 10° C./minute, retaining at the same temperature for 10 seconds using a hydrogen reduction furnace (10% H$_2$+N$_2$), and slowly cooling using N$_2$ gas. These conditions are an imitation version of those for a continuous annealing furnace.

The capability of supporting the active material was evaluated by the following test.

To both surfaces of a rectangular metal foil of 50 mm in width and 150 mm in length, the active material was applied, which was heated and press-bonded to form an electrode. The application of the active material was performed such that the whole thickness of the active material (the sum of the thicknesses of the active materials applied to the both surfaces of the metal foil) was 500 μm in a dry state.

This electrode was wound around a stainless steel wire of 1 mm in diameter and then rewound. The amount of the active material fallen (peeled) was measured by an electronic force balance. The results are shown in Table 1.

As an evaluation criterion, the amount of the peeled active material of 0 to 0.5% or less was expressed by ⊚, above 0.5 to 1.0% or less by ○, above 1.0% to 3.0% or less by Δ and above 3.0% by ×.

As apparent from Table 1, the metal foils of Nos. 1 to 23 had the breaking strength (S) of 150 to 530 MPa, the tensile elongation (ε) of 5.5 to 15.0 (%), the Young's modulus (Y) at 25° C. of 136000 to 205000 MPa, the (T×S×Y) value of 5.4×10$^8$ to 30.9×10$^8$, and the ε−(0.0005×T$^2$) value of 5.5 to 14.8. Thus, each of the foils was favorable in capability of supporting the active material.

On the other hand, the Ni foil of No. 24 of Comparative Example showed the tensile elongation (ε) as large as 16.0% because it was annealed at 820° C. and was poor in capability of supporting the active material because the value of ε−(0.0005×T$^2$) was as large as 16.0.

The Ni foil of No. 25 showed the tensile elongation (ε) as small as 4.6% because it was annealed at 470° C. and was poor in capability of supporting the active material because the value of ε−(0.0005×T$^2$) was as small as 4.4.

The Ni foil of No. 26 showed the tensile elongation (ε) as large as 16.2% because it was annealed at 820° C. and was poor in capability of supporting the active material because the value of ε−(0.0005×T$^2$) was as large as 16.0.

The Ni foil of No. 27 showed the breaking strength (S) as high as 700 MPa because it was not annealed, and was poor in capability of supporting the active material because the tensile elongation (ε) was as small as 2.1%, the value of (T×S×Y) was as large as 43.1×10$^8$ and the value of ε−(0.0005×T$^2$) was as small as 1.7.

The Ni foil of No. 28 showed the value of (T×S×Y) as large as 31.4×10$^8$ because the thickness was as large as 42 μm, and therefore was poor in capability of supporting the active material.

The Ni foil of No. 29 showed the value of (T×S×Y) as large as 36.9×10$^8$ because the thickness was as large as 50 μm, and therefore was poor in capability of supporting the active material.

The Fe foil of No. 30 showed the tensile elongation (ε) as small as 3.1% because it was annealed at 450° C. and was poor in capability of supporting the active material because the value of ε−(0.0005×T$^2$) was as small as 2.7.

The Cu foil of No. 31 showed the tensile elongation (ε) as small as 4.4% because it was annealed at 450° C. and was poor in capability of supporting the active material because the value of ε−(0.0005×T$^2$) was as small as 4.0.

Industrial Applicability

The metal foil according to the present invention has a thickness, a breaking strength, a tensile elongation and a Young's modulus which are determined in an appropriate range. Therefore, the metal foil will not break in the step of manufacturing the electrode and is excellent in capability of supporting the active material and in electric conductivity. With the use of the metal foil as a current collector for a secondary battery, the battery can be improved in performance.

What is claimed is:

1. A metal foil for a current collector of a secondary battery formed by electrodeposition and has a thickness (T) of 8 to 40 μm, said metal foil satisfying the following formulae:

$$4.9 \times 10^8 \leq T \times S \times Y \leq 31 \times 10^8$$

$$4.5 \leq \epsilon - (0.0005 \times T^2) \leq 15$$

where S is a breaking strength (MPa), ε is a tensile elongation (%) and Y is a Young's modulus (MPa).

2. The metal foil for a current collector of a secondary battery in accordance with claim 1, wherein said metal foil is a nickel foil.

3. A method of manufacturing the metal foil in accordance with claim 1 or 2, wherein said metal foil formed by electrodeposition is softened or annealed.

* * * * *